United States Patent [19]
Sundberg

[11] 3,801,399
[45] Apr. 2, 1974

[54] METHOD AND SHEATH FOR LEAD-ACID STORAGE BATTERY

[75] Inventor: Erik Gustav Sundberg, Osbacken, Nol, Sweden

[73] Assignee: Aktiegolaget Tudor, Stockholm, Sweden

[22] Filed: Apr. 18, 1972

[21] Appl. No.: 245,287

Related U.S. Application Data

[62] Division of Ser. No. 28,436, April 14, 1970, Pat. No. 3,694,265.

[52] U.S. Cl.................... 156/148, 136/43, 136/55, 156/172, 156/187, 156/229
[51] Int. Cl............................................. D03d 1/00
[58] Field of Search ........ 156/148, 149; 136/26, 38, 136/43, 53, 54, 55, 63, 65, 147; 87/6, 7, 9

[56] References Cited
UNITED STATES PATENTS

| | | | |
|---|---|---|---|
| 2,896,006 | 7/1959 | Sundberg | 136/43 |
| 3,224,905 | 12/1965 | Hentschel | 136/55 |
| 3,081,368 | 3/1963 | Wunsche | 136/43 |

FOREIGN PATENTS OR APPLICATIONS

| | | | |
|---|---|---|---|
| 638,649 | 3/1962 | Canada | 136/43 |

Primary Examiner—Alfred L. Leavitt
Assistant Examiner—Frank Frisenda, Jr.
Attorney, Agent, or Firm—Burns, Doane, Swecker & Mathis

[57] ABSTRACT

Method and sheath for lead-acid storage battery electrode comprising a braid of glass fiber threads bonded by stom threads of substantially untwisted glass fibers and highly twisted thermoplastic fibers. The stem threads of glass fibers provide axial strength sufficient to allow the heat treating of the sheath while under tension either in a stationary or continuous process.

5 Claims, 4 Drawing Figures

METHOD AND SHEATH FOR LEAD-ACID STORAGE BATTERY

This application is a division of my copending U.S. Pat. application Ser. No. 28,436, filed Apr. 14, 1970, now U.S. Pat. No. 3,694,265.

BACKGROUND OF THE INVENTION

The present invention refers to iron-clad electrodes for lead-acid storage batteries. Iron-clad electrodes consist of a plurality of metallic rods or cores arranged parallel to and at a distance from each other, which cores are conductively connected with each other. Each of the metallic cores is surrounded by and in contact with the active material which in turn is surrounded by a tubular sheath.

The rod sheaths are electrically insulating. The material in the sheaths is resistant to the electrolyte and to the attacks to which it is exposed in the battery cell during operation, especially oxidation due to nascent acid. The sheaths must be easily permeable by the electrolyte, produce as little electric resistance as possible, and prevent the active material from losing contact between the electrolyte and with the conductive core.

Initially made of slit hard rubber, the sheaths have later come to consist of woven or braided materials of various kinds of impregnated threads or of thermoplastic foil or the like. The replacement of the hard rubber tubes with woven material constitutes a big step forward both with respect to durability and to capacity and effectiveness. Thus, sheaths consisting of a glass fiber weave impregnated with some plastic that is resistant under these conditions, for example, phenol resin, have come into use with some success.

It has also been proposed to let the sheaths consist of braided or woven threads of plastic fiber, for example a polyester of ethylene glycol and terephthalic acid. Glass of suitable quality has been found especially usable for the fibers in the preparation of the woven or braided sheaths. The glass does not stretch, or at least only insignificantly, which keeps the active material in good contact with the conductive rods or cores despite the tendency of the active material to swell during discharge of the battery.

It has been found difficult, however, to bind the weave or braid of the sheaths due to the smooth surface of the glass fibers. It is not permissible for the glass threads in the sheaths to slide in relation to each other and in that way to create an irregular weave structure whereby the distance between the threads in some places may become so large that active material can force itself through and thus be lost from the electrode. To prevent the appearance of too large openings in the sheath weave or braid when glass fiber yarn is used, it has been proposed that a part of the threads extending in the axial direction of the sheath consist of monofilament threads of thermoplastic material, for example polyethylene or polypropylene. These so-called stem threads were subsequently welded together by heat treatment with the other usually multifiber weave threads.

Braided or knitted sheaths have also been proposed. These sheaths consist of thermoplastic monofilament threads which are welded together by a heat treatment and thereby received the necessary rigidity for the subsequent application to the electrode skeleton.

All the kinds of electrode sheaths enumerated here are subject to more or less conspicuous disadvantages, which has resulted in some of the said constructions having been abandoned. It has also been found that modern types of glass compounded for the purpose are preferable to the plastic. The glass is also considerably cheaper than corresponding threads of other material suitable for the purpose.

As previously mentioned, however, the glass threads in the sheath weave must be fixed, i.e., locked to each other, so that they cannot shift in relation to each other. When woven or braided in monofilament threads of thermoplastic material, it has been found that the plastic material will shrink and thus shorten the length of the sheath during the heat treatment. It is possible to clamp the sheaths during the heat treatment so that they cannot be shortened, but the thermoplastic threads may break and fail to stiffen the sheaths as desired.

It is accordingly an object of the present invention to provide a novel electrode sheath that has high chemical stability, good permeability, and low electric resistance and which avoids the above-mentioned disadvantages.

Another object is to provide a novel method of manufacturing an electrode sheath in which the above-mentioned disadvantages are avoided.

THE DRAWINGS

This and other objects and advantages of the present invention will be apparent from the claims and from the following detailed description when read in conjunction with the appended drawings, in which:

THE DETAILED DESCRIPTION

Figure 1:
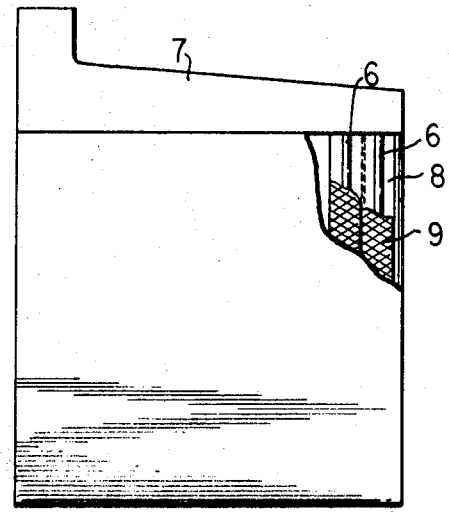
FIG. 1 is an elevation of a battery electrode with portions broken away to show the construction thereof.

With reference to FIG. 1, an electrode comprises a plurality of metallic rods 6 conductively coupled by a cross member 7. Surrounding each of the rods 6 is active material 8 held in place on the rods by a sheath 9.

With reference now to the remaining figures where like numerical designations have been accorded like parts to facilitate an understanding of the invention, the sheath comprises a tubular weave or braid of glass fiber threads 10 provided with so-called stem threads 12 running in the axial direction of the tubular sheath. The stem threads 12 comprise glass fibers and fibers of a thermoplastic material, for example, polypropylene. The plastic material is preferably multifilament in the stem threads and the mixed thread so comprised can be parallel, as illustrated, or if desired, more or less twisted. Surprisingly, it has been found that such a mixed thread does not contract during heat treatment but that, on the contrary, after the treatment it is stronger than before. The glass in the mixed thread prevents the shrinking of the thermoplastic material and therefore a stretching of the latter material occurs during the heat treatment.

In constructing the tubular sheath, the thermoplastic material is allowed to soften in a heat treatment exactly as much as is required to bond the intersecting glass fiber threads 10. For example, when polypropylene is used in the stem threads 12, heating to a temperature of 190° C. has been found suitable. A sheath suited for the purpose consists of continuous multifilament glass fiber yarn in the weave or braid; however, the part of the threads running in the axial direction of the sheath (stems in braided sheaths and warp threads in woven ones) consist of non-twisted or only insignificantly twisted glass fibers and, disposed in parallel therewith, relatively strongly twisted polypropylene threads of staple fibers. Such multifilament yarn has a very fluffy appearance, which seems to contribute manifestly to the good stability of the untreated braid or weave.

Figure 2:
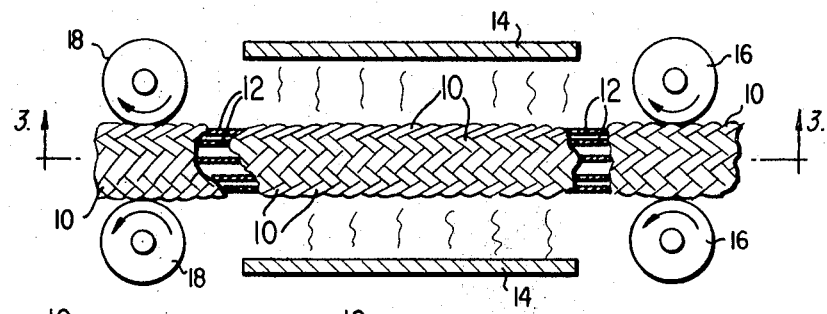
FIG. 2 illustrates the continuous heat treating of a longitudinal portion of a sheath braided in the round with portions broken away to show the construction thereof.
Figure 3:
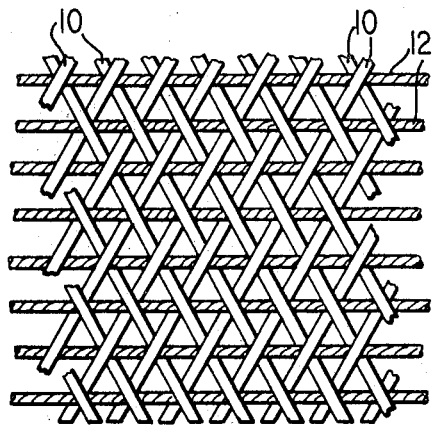
FIG. 3 illustrates the sheath of FIG. 2 cut open along the lines 3—3 and flattened out in a planar condition.
Figure 4:
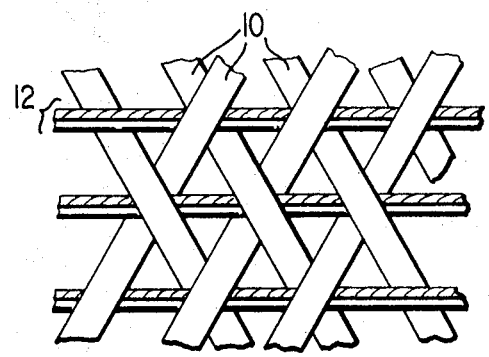
FIG. 4 is a second embodiment of the sheath of the present invention cut and in a flattened out condition.

As illustrated in FIG. 2, the tubular sheath of the present invention may be continuously heat treated while traveling through a cylindrical heating element 14 under the tensile force provided by two pairs of gripping wheels 16 and 18. Tension may be provided, for example, by driving the leading pair of wheels 18 slightly faster than wheels 16. The sheath may, if desired, be supported on a cylindrical mandrel (not shown) while being heat treated, and thereafter cut to desired lengths.

Alternatively to the continuous process described, the ends of precut lengths of sheath may be gripped and the sheaths thereafter placed under the appropriate tension during the heat treating process.

The placing of the sheath under tension during the heat treatment prevents the shrinkage of the plastic material which as a practical matter is quite important. The amount of tension is not critical; however, it must be less than that which causes breaking of the glass fiber yarn. An important reason for the glass fiber strands in the axially directed stem threads 12 is to simplify the process where heat treatment of the sheath can be part of a continuous process.

The glass fibers in the stem threads 12 may be replaced by other inorganic fibers. It is important that the temperature which effects bonding of the fibers be insufficient to soften the glass fibers. Any fiber used must be resistant to the electrolyte.

After heat treatment the sheath shows extremely good rigidity, shape permanence and permeability. Moreover, batteries equipped with electrodes as in the present invention show relatively low internal resistance.

The tubular sheath might be made stiffer for easier heating during assembling of the electrodes by dressing the same with a dressing-glue. Polyvinyl alcohol may be employed as a stiffener as this material is soluble into the electrolyte and accordingly does not diminish the porosity of the tubular sheath. Other stiffeners likewise in this connection are starch, dextrin, and the like.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of forming a tubular sheath for maintaining active material in an electrode of a tube-plate type in a lead-acid storage battery comprising the steps of:

a. providing a braid or weave of inorganic fiber threads having a plurality of spaced threads running axially along the length thereof and forming crossing points with the threads of the braid or weave, said axially disposed threads consisting of a mixture of inorganic and thermoplastic fibers wherein the inorganic fibers in said axially disposed threads are substantially untwisted and the thermoplastic fibers in said axially disposed threads are highly twisted;

b. forming the braid or weave into a tubular sheath;

c. heating the braid or weave to a temperature sufficient to soften the thermoplastic material but insufficient to affect the properties of the inorganic thread material to bond the inorganic and thermoplastic fiber threads of the sheath at their crossing points only; and d. cooling the sheath.

2. The method of claim 1 wherein the thermoplastic threads are polypropylene, wherein the inorganic fiber threads comprise multifilament glass fiber yarn, and wherein the sheath is heated to about 190° C.

3. The method of claim 2, including the steps of maintaining the sheath under axial tension less than the breaking strength of the axially disposed threads during the steps of heating and cooling the sheath and axially moving the sheath during the steps of heating and cooling the sheath.

4. The method of claim 1 including the step of maintaining the sheath under axial tension less than the breaking strength of the axially disposed threads during the steps of heating and cooling the sheath.

5. The method of claim 4 including the step of axially moving the sheath during the steps of heating and cooling the sheath.

* * * * *

UNITED STATES PATENT OFFICE
CERTIFICATE OF CORRECTION

Patent No. 3,801,399                    Dated  April 2, 1974

Inventor(s)  ERIK G. SUNDBERG

It is certified that error appears in the above-identified patent and that said Letters Patent are hereby corrected as shown below:

Column 1, lines 10 and 11, for "iron-clad electrodes"

substitute --tubular electrodes--.

Signed and sealed this 22nd day of October 1974.

(SEAL)
Attest:

McCOY M. GIBSON JR.                C. MARSHALL DANN
Attesting Officer                  Commissioner of Patents